Oct. 25, 1932.   M. E. WIDELL   1,884,942
CAN TESTER
Filed Oct. 16, 1929   4 Sheets-Sheet 1

Fig. 1

INVENTOR
Magnus E. Widell
BY
John C. Carpenter
ATTORNEY

Oct. 25, 1932.  M. E. WIDELL  1,884,942
CAN TESTER
Filed Oct. 16, 1929   4 Sheets-Sheet 2

INVENTOR
Magnus E. Widell
BY
John C. Carpenter
ATTORNEY

Oct. 25, 1932.    M. E. WIDELL    1,884,942
CAN TESTER
Filed Oct. 16, 1929    4 Sheets-Sheet 4

INVENTOR
Magnus E. Widell
BY
John C. Carpenter
ATTORNEY

Patented Oct. 25, 1932

1,884,942

UNITED STATES PATENT OFFICE

MAGNUS E. WIDELL, OF CINCINNATI, OHIO, ASSIGNOR TO AMERICAN CAN COMPANY, OF NEW YORK, N. Y., A CORPORATION OF NEW JERSEY

CAN TESTER

Application filed October 16, 1929. Serial No. 400,123.

The present invention relates to pneumatic testers for tin cans and other metal containers and is particularly directed to a simple semi-automatic machine comprising a plurality of independent, self-contained testing units.

The principal object of the invention is the provision of an apparatus which constantly operates to receive cans for testing and which detects and indicates any leaks that may be present in the cans during their movement with the machine, each testing unit being a complete organization and independent of the other units.

An important object of the invention is the provision of a testing apparatus embodying a plurality of can carriers, each carrier being composed of readily replaceable parts whereby it may be readily adapted to different can shapes and sizes.

A further important object of the invention is the provision of a testing apparatus of the semi-automatic type wherein cans are placed by hand, or in other suitable manner, into one of a number of can testing units continuously movable with moving parts of the apparatus, the units embodying means for filling each can to be tested with compressed air, devices for automatically detecting any leakage of air which may occur in a defective can and mechanism indicating such defect prior to the can being brought to its discharge station.

A further important object of the invention is the provision of an efficient can testing unit operating in connection with an electrical circuit for giving a visional indication of a leaky condition in a can under test.

Numerous other objects and advantages of the invention will be apparent as it is better understood from the following description, which, taken in connection with the accompanying drawings, discloses a preferred embodiment thereof.

Referring to the drawings:—

The apparatus of the present invention is of the semi-automatic type wherein the can is placed into one of a number of can testing units and is removed from the unit after the testing operation, the parts being so designed as to permit their ready readjustment and in many cases merely the replacement of one or more of the parts for cans of different sizes and shapes. During the time the can is within the apparatus, it is automatically subjected to a test to determine leaks, if any, and any leaky condition of the can is clearly indicated so that the same may be separated from the cans which are free from leaks.

The apparatus consists generally of a stationary frame and a movable frame, the latter carrying a plurality of spaced can testing units, each unit comprising a can carrier, a can detector and a leak indicator, each unit being independent of the other units in the machine and operating on one can at a time. Cans are fed into the apparatus at a given position and are conveyed by rotation of the movable frame, which carries the can testing units, to a place of discharge where the cans are removed from the machine.

During this passage of the can, the same is clamped and held in a carrier and compressed air is introduced into its interior. This compressed air at the same time communicates with that particular can detecting device which is associated with that carrier, the detecting device being thereby set for the testing operation.

During the passage of the can through the testing cycle any leakage of compressed air therein will cause operation of the detecting device which, thereupon, closes an electrical circuit passing through a can-leak indicator, this indicator in the preferred embodiment being an electric lamp. The lighting of the lamp at such a time gives visional evidence of the leaky condition in the can.

The apparatus is supported upon a base 21 (Fig. 2) which carries a stationary frame including a column 22, extending arms 23 secured to the column and supporting a circular shield 24 provided with a vertical wall 25 and a horizontal top flange 26. The upper end of column 22 is provided with an annular channel 27 (Fig. 4) in which rests a ball bearing system 28 forming the support for a movable frame 29. Movable frame 29 comprises a horizontal table 35 which supports a plurality of can testing units and which is positively and continuously rotated.

The frame 29 carries an internal ring gear 36 (see also Figs. 2 and 3) which is engaged by a pinion 37 mounted upon the upper end of a vertical shaft 38 journaled in bearings 39 formed in the column 22. Shaft 38 carries, near its lower extremity, a worm wheel 41 which meshes with a worm 42 mounted on a horizontal drive shaft 43 journaled in bearings 44 projecting from one side wall of the column 22. Shaft 43 is driven in any suitable manner, as by application of power to a belt pulley 45 secured thereto.

Figure 1:
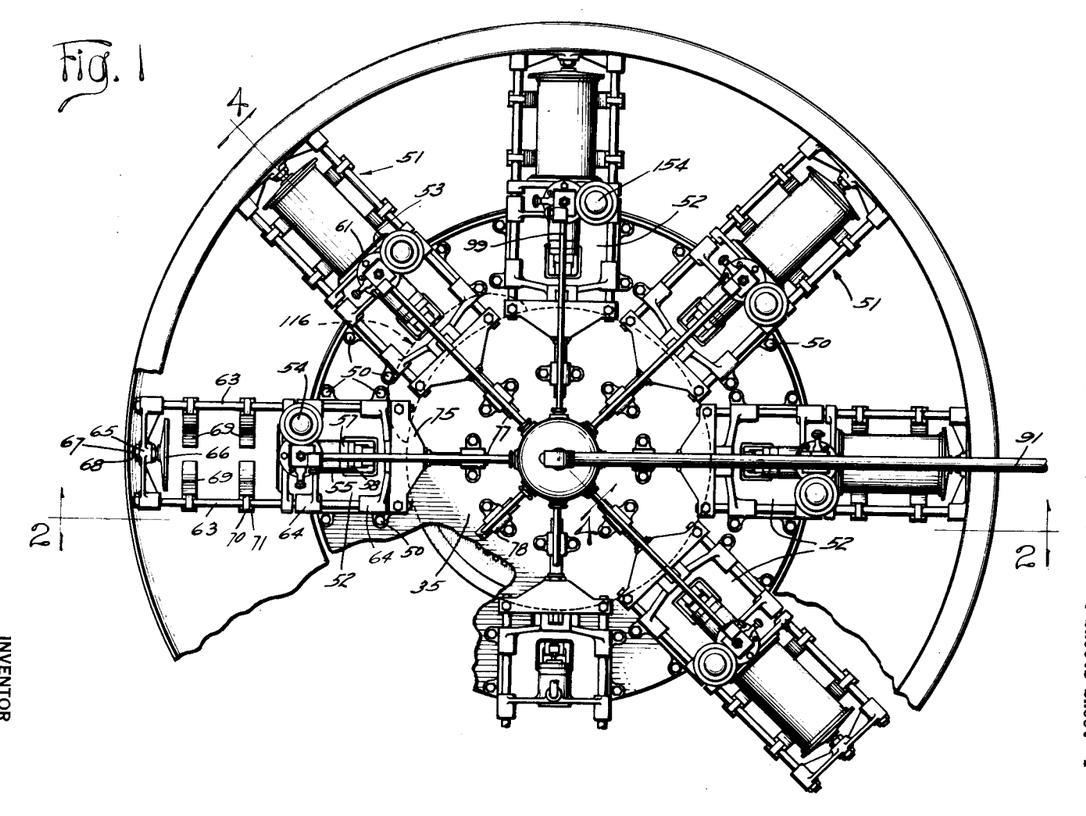
Figure 1 is a plan view of the apparatus of the present invention, parts being broken away.
Figures 4, 5, 6, 7, 8:
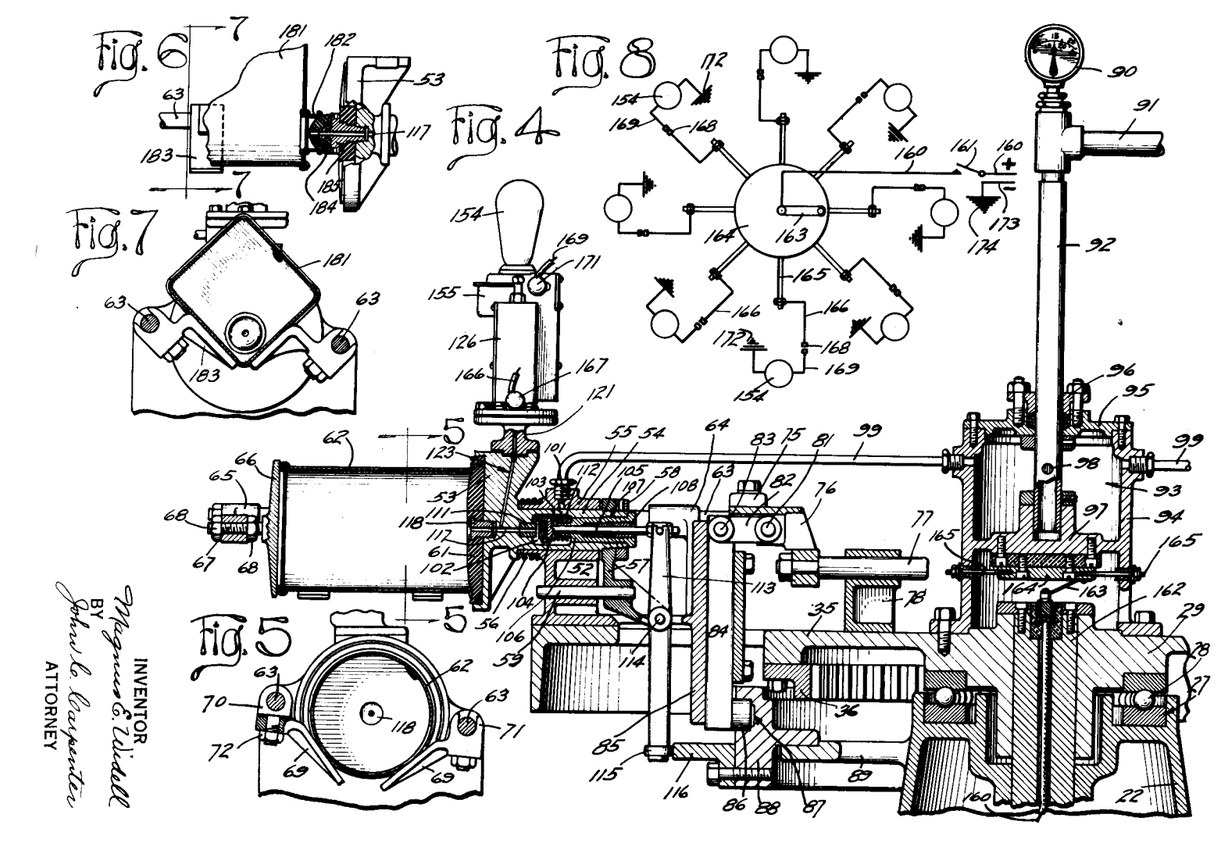
Fig. 4 is a longitudinal section of one-half of the apparatus, the view being taken substantially along the line 4—4 in Fig. 1.
Fig. 5 is a sectional detail of a can carrier taken substantially along the line 5—5 in Fig. 4.
Fig. 6 is a fragmentary sectional detail of part of a can testing unit adapted to a slightly different type of can.
Fig. 7 is a sectional view taken substantially along the line 7—7 in Fig. 6.
Fig. 8 is a wiring diagram of the electrical circuits embodied in the present invention.
Figure 9:
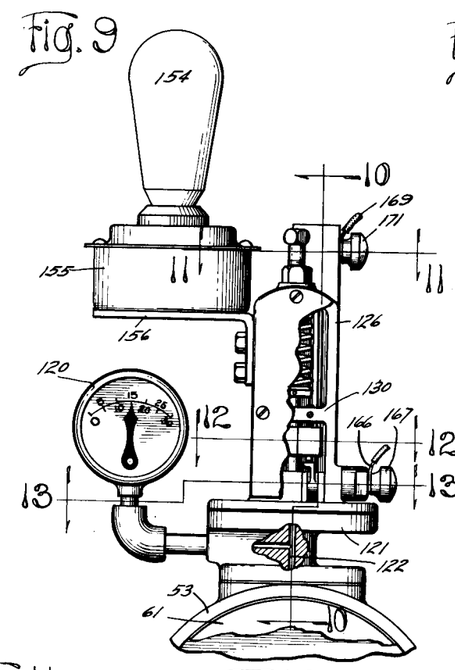
Fig. 9 is a front elevation, partly broken away, of one of the can-leak detecting devices.

The movable frame 29 has mounted on its table section 35 a plurality of can testing units, each bolted thereto and referred to generally by the numeral 51. Each unit embodies a can carrier bracket 52 secured to the table 35 by bolts 50 (Fig. 1) and this bracket carries a can clamping disc 53 provided with a horizontally extending hollow stem 54 mounted in a bearing 55 formed in the bracket 52 (Fig. 4). Each disc 53 has a relatively slight movement within its bearing 55, its stem 54 sliding longitudinally therein, the disc being normally held outwardly by a coil spring 56 interposed between its rear edge and a part of the bracket 52. Stem 54 has an arm 57 threadedly secured on its rear end and held in adjusted position by a locknut 58, the arm extending over and having slight sliding movement on a horizontal guide pin 59 carried by the bracket 52. This construction prevents rotation of the stem 54 relative to the bracket 52 while allowing some sliding movement for a purpose hereinafter described.

A rubber disc 61 is carried on the forward face of each disc 53 and is adapted to engage the open end of a can body 62 placed in the can carrier for the testing operation. Such a carrier comprises a pair of spaced horizontal rods 63 (Figs. 1 and 2) which are slideably mounted in bearings 64 carried by each bracket 52, the outer end of each pair of rods 63 being joined by a crosshead 65 which carries a plunger or plate 66 adjustably positioned therein, a threaded stem 67 on the plate being locked in position by locknuts 68.

Figures 2, 3:
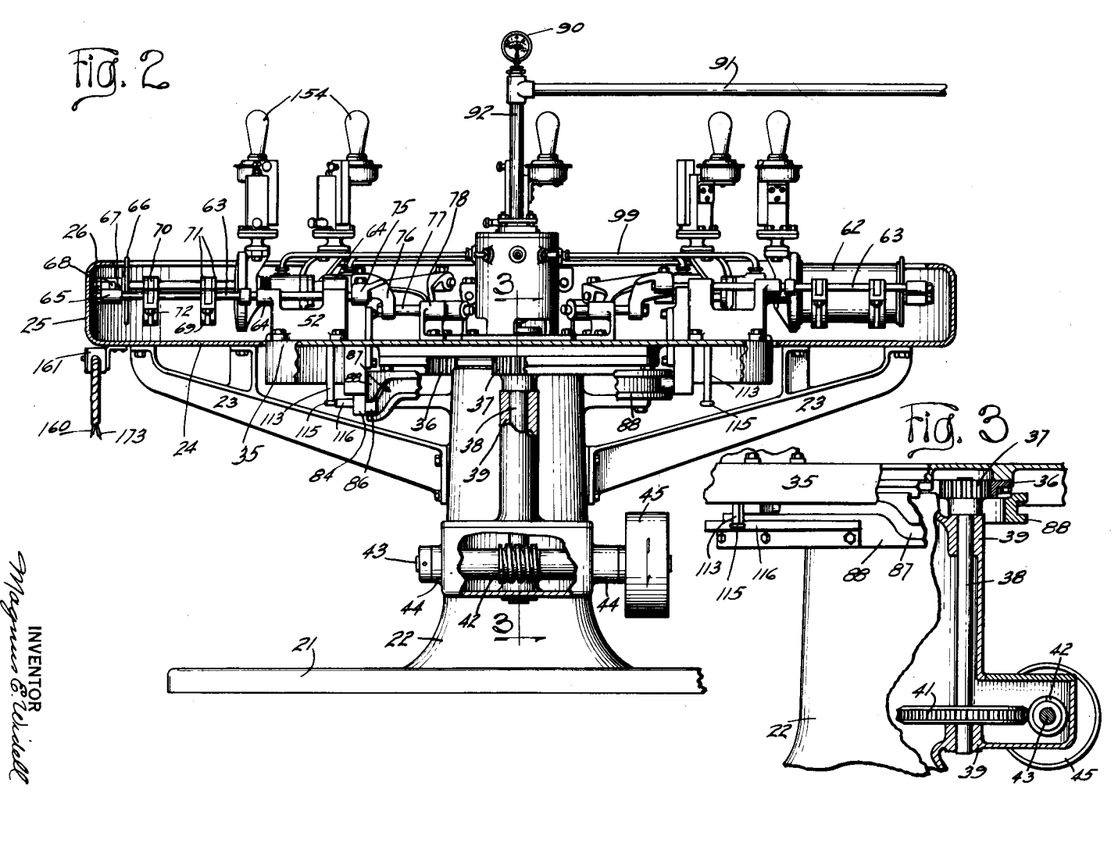
Fig. 2 is a cross-sectional view taken substantially along the line 2—2 in Fig. 1, some parts being shown in side elevation.
Fig. 3 is a transverse combination section and elevation, taken in part along the line 3—3 in Fig. 2.

Preferably two pairs of can support members or arms 69 are adjustably clamped on the rods 63, each arm being held in fixed position by an eye bolt 70 on one or the other of the rods 63 (see Figs. 2 and 5). Each bolt 70 when in clamped position rests between spaced and slotted lugs 71 formed on one end of each arm, this being the end connecting with and being supported by the rod 63. A shank of the bolt 70 passes through an opening formed in that part of the arm which is intermediate the slots. A lock nut 72 threaded on the end of the shank draws the slotted lugs of the arm tightly against the rod 63 and clamps the arm in adjusted position. Each pair of arms 69 are radially positioned on the rods to engage an outer wall of the can to be tested, the center of the can being aligned with the center of the disc 61 and these arms in combination with the rods 63 form a can receiving cradle.

Each plate 66 is spaced from its associated disc 53 a distance in excess of the height of the can 62 to be tested, or in other words, the can cradle carrier is open, when brought into can receiving position. After the can has been placed in a horizontal position within the supports 69 with its open end against the disc 61, rods 63 are slid within their bearings 64, and the plate 66 is moved closer to the disc 53, thereby clamping the can firmly between its plate 66 and the resilient disc 61. At such time, that is, when the can is being clamped in its carrier, the discs 53 and 61 move backward against the action of spring 56. In fully clamped position, therefore, the can 62 is held firmly by the spring 56, the yielding nature of the disc 61 insuring a sealing of its open end.

The clamping of a can and the moving of the plate 66 takes place under cam action, the inner ends of each pair of rods 63 (Figs. 1, 2 and 4) being connected by a cross head 75 which is formed with a downwardly projecting bracket member 76 carrying a horizontally movable locating pin 77 sliding in a bracket 78 bolted to the table 35. The spaced bearings 64 and the pin 77 insure free sliding movement of the rods 63 as they move to clamped position.

Crosshead 75 is pivotally connected at 81 to a link 82, in turn pivotally connected at 83 to a bar 84 freely sliding in a vertical bearing 85 formed in the bracket 52. The lower end of the bar 84 carries a cam roller 86 which during rotation of the frame 29 and parts carried thereby moves within and along a cam groove 87 of a ring cam 88 supported by arms 89 projected from the upper end of the column 22.

By reason of the contour of the cam groove 87, the bar 84 is raised as the can carrier passes the can receiving station and this upward movement operating through the described connections forces the crosshead 75 toward the center of the machine drawing the rods 63 inwardly and moving the plate 66 to its clamped position. It will be observed by reference to Fig. 4, which shows the can in its fully clamped position and the bar 84 in fully raised position, that the pivotal centers 82 and 83 are in horizontal alignment this insuring a locked position of the clamping members.

For the purpose of testing the can so clamped, provision is made for the introduction of air into its interior. Air under pressure is received from any suitable source of supply and brought into the machine through a service pipe 91 (Figs. 1, 2 and 4) which connects with a vertical pipe 92 extending downwardly from above the machine and along its vertical center. A pressure gage 90 may be introduced in the pipe lines 91 and 92 to show the air pressure therein. Pipe 92 projects into an air chamber 93 confined in a tubular casing 94 mounted upon and secured to the table 35 of the frame 29.

The upper end of the casing 94 is closed by a cover plate 95 securely bolted thereto and where the pipe 92 extends through the cover plate, there is provided a suitable stuffing box 96 to prevent any leakage of air from the chamber 93 to the outside atmosphere. The lower end of pipe 92 extends into a base member 97 which forms a partition wall centrally of the casing 94 and provides a bottom wall for the chamber 93. Lateral openings 98 in the pipe 92 form communication between its interior and the chamber 93 and permit passage of the compressed air into the chamber.

Each can testing unit is connected with the chamber 93 there being provided for this purpose a pipe 99 threaded into the casing 94 (Fig. 4) and extending radially over the table 35 connecting at its opposite end into the bearing 55 of the bracket 52 of each unit. The stem 54 of each disc 53 is provided with a central valve chamber 102 and communication is made with the interior of pipe 99 through a radial port 103 formed in the stem and connecting at all times with a port 101 extending through one wall of the bearing 55 and connecting with the end of the pipe 99.

A cam operated valve mechanism is provided for controlling passage of air from each chamber 102 and comprises a sliding valve 104 carried on the forward end of a horizontal valve stem 105 sliding within a valve casing 106 threadely confined within a horizontal bore 107 provided in the stem 54. This casing 106 provides an end wall for the valve chamber 102 and also provides a proper sliding bearing for the rod 105, leakage of air thereabouts being prevented by a suitable stuffing box 108.

Valve 104 normally engages a tubular valve seat 111 positioned in the disc 53 at one end of the chamber 102 and when so engaged passage of air from the chamber 102 is prevented. The valve 104 is normally held in closed position by a coil spring 112 interposed between the back wall of the valve 104 and the forward end of the casing 106. The valve parts are in their normal positions when a can is received into the machine and after it has been fully clamped in position for testing, valve 104 is moved backward by sliding action of its rod 105 to disengage the valve seat 111 and permit air to flow from the chamber 102.

The sliding of the rod 105 is effected through reciprocation of a lever 113 pivotally connected with the rod 105, the lever being pivoted at 114 to the bracket 57. The lower end of lever 113 carries a cam roller 115 which moves around but spaced away from the outside of the stationary ring cam 88 as the entire can testing unit rotates with the frame 29 and at one position during this travel it is brought into engagement with a cam plate 116 (Figs. 1 and 4) projecting outwardly from and bolted to the cam 88, the cam groove 87 at this place being at the upper part of the cam, as shown in Fig. 4. Bar 84 and roller 86, therefore, passes above the plate 116. While roller 115 is in engagement with the cam plate 116, the lever 113 holds valve 104 in its open position.

With the valve 104 open air under pressure flows from the chamber 102 through a horizontal passageway 117 formed centrally of the disc 53 through a threaded bushing 118, secured to the disc and passing centrally through the rubber 61, and into the interior of the clamped can 62.

Associated with each disc 53 is a can-leak detecting device illustrated in detail in Figs. 9 to 14 inclusive and which comprises a base 121 provided with a vertical bore 122 communicating with a passageway 123 formed in the disc 53 and connecting with the passageway 117. A part of the air flowing from chamber 102 into the interior of the can 62 thus flows through the passageways 123 and 122 and into a diaphragm chamber 124 closed at its upper end by a flexible diaphragm 125 interposed between the upper end of the base 121 and a detector casing 126 mounted upon and secured to the base.

The pressure of the air in the chamber 124, may be indicated on a pressure gage 120 (Fig. 9) connected to the base 121 and communicating with the passageway 122 and this pressure is equal at all times to the pressure of the air within the interior of the can 62 and is utilized to test a can for leakage. The detector casing 126 encloses a chamber 127 which contains the detector parts among which there is an electrical contact element for controlling a leak indicator described hereinafter.

A vertically moving stem 128 slides within a boss 129 formed integrally with the base 121, and within a wall 130 formed in the casing 126, this wall constituting a central partition extending in the chamber 127. Stem 128 is enlarged at its bottom end in a head 131 resting upon the upper surface of the diaphragm 125. In the absence of air under pressure in chamber 124 this stem 128 and diaphragm 125 are held in lowered position by a coil spring 132 positioned in the upper part of the chamber 127. Spring 132 is connected with solid upper and lower blocks, the latter resting upon the upper end of the stem 128 while the upper block is engaged by an adjusting screw 133 extending through the top wall of the casing 126.

Adjustment of the screw 133 to properly tension the spring 132 is made to counteract any desired pressure against the diaphragm 125. As the air in the chamber 124 reaches a predetermined pressure, the resistance of the spring 132 will be overcome and the diaphragm 125 will be lifted forcing the stem 128 and its head 131 upwardly.

Vertical movement of the stem 128 affects the electrical contact element previously mentioned and which is located within the chamber 127 and which controls the leak indicator as will now be explained.

Figure 10:
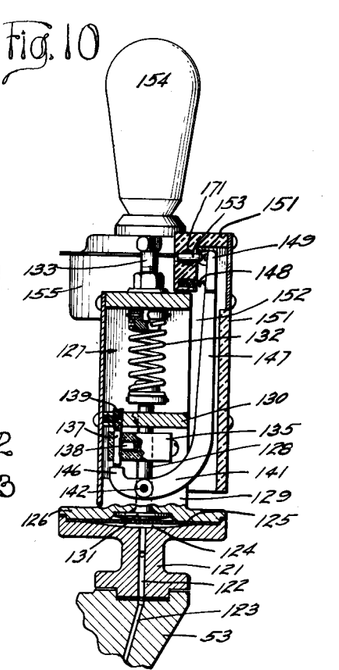
Fig. 10 is a sectional view of the same taken substantially along the line 10—10 in Fig. 9.
Figures 11, 12:
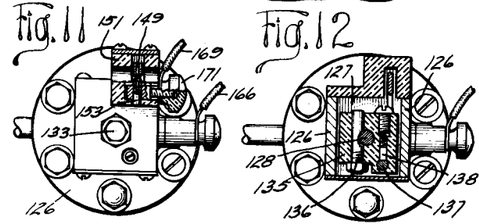
Fig. 11 is a plan sectional view taken substantially along the line 11—11 in Fig. 9.
Fig. 12 is a similar view taken along the line 12—12 in Fig. 9.
Figure 13:
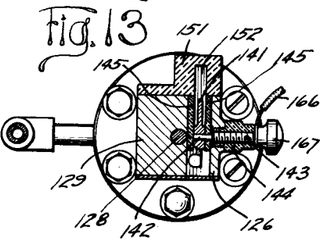
Fig. 13 is a similar view taken along the line 13—13 in Fig. 9.
Figure 14:
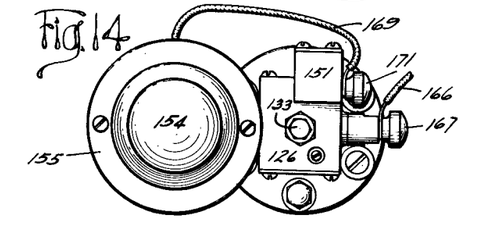
Fig. 14 is a top plan view of the parts illustrated in Fig. 9.

Adjustably secured in vertical position upon the stem 128 is a block 135 formed of some electrical insulating material, the block being held in position by means of a notched clamp screw 136, (Fig. 12). Block 135 carries a pin 137 (see also Fig. 10) frictionally held in position by means of a spring pressed button 138 positioned in the block 135 and contacting one side of the pin 137. This pin 137, as the stem 128 and its block 135 is raised, strikes against a stop screw 139 adjustably secured in the partition wall 130 and its movement is then arrested but further upward movement of the block 135 continues, the block at such time sliding over the pin. This insures setting of the pin in an exact position in the block prior to each testing operation and following the filling of the can with air.

The contact element previously mentioned comprises a hooked lever 141 (Figs. 10 and 13) pivoted on a pin 142 carried on the forward end of a stem 143 threadedly secured within an insulating bushing 144 carried by one side wall of the detector casing 126. Lever 141 moves about its pivot 142 being confined by insulating plates 145 positioned within the chamber 127.

Lever 141 is provided with a short arm 146, the upper end of which normally engages the lower end of pin 137 when the block 135 is in raised position, this position being illustrated in Fig. 10. At such a time a long arm 147 of the lever 141 is held in an outward position by a spring 148 interposed between a contact head 149 carried by the arm 147 and an elongated insulating block 151 mounted upon and extending along one side of the casing 126. Insulating block 151 (Figs. 10 and 13) is provided with a vertically extending slot which forms a chamber 152 in which the arm 147 operates.

With air under pressure in can 62 and chamber 124 and with the parts of the can detecting device in the position illustrated in Fig. 10, the can is carried through its testing cycle. If the can is a good can without leaks, this air is held at full pressure and the various parts of the detecting device remain in the positions shown.

If the can is defective there will then be a leakage of air and the pressure of air beneath the diaphragm 125 will drop. Spring 132 then acts to lower the stem 128 and its head 131, the diaphragm 125 being correspondingly depressed. In like manner, block 135 moves downwardly and the pin 137 carried thereby presses against the short arm 146 of the lever 141 and pivots the same about its pin 142, swinging its long arm 147 over against a contact post 153 carried by the block 151. This closes an electrical circuit which includes the pin 153 and the head 149 and an electrical current will be established for a purpose now to be described.

In the preferred embodiment of the invention as illustrated, leakage of a can will be indicated by the lighting of a lamp 154 mounted upon a base 155 carried by a bracket 156 which is bolted to the casing 126. This lamp is connected in the electrical circuit referred to and upon closing of the contact elements 153 and 149, electrical current flowing through the circuit will illuminate the lamp.

By reason of the difference in length of the short arm 146 and the long arm 147 only a very small movement of the former will be compounded into a relatively large movement of the long arm and, therefore, a very slight reduction of the air pressure beneath the diaphragm 125 will immediately close the contacts 149 and 153 and practically instantaneously establish the electrical leak indicating circuit. Continued leaking of the can and further reduction of pressure below the diaphragm 125 permits further lowering of the stem 128 and its block 135 under action of the spring 132 but this extra movement does not affect the now stationary pin 137, the block 135 moving thereover. This prevents damage to the parts and provides a quick-acting detector and indicator independent of the amount of air leaking from the can.

Reference should now be had to Fig. 8 which illustrates in diagram, the electrical circuit referred to. This circuit comprises a positive lead wire 160 which preferably passes through a service switch 161 (illustrated in Fig. 2 as being mounted on the shield 24). This wire 160 then extends upwardly through the center of the machine being held in an insulated bushing set in the top end of a stem 162 (shown in Fig. 4) held in stationary position within the column 22 and projecting upwardly through the frame 29. The wire 160 at the top of the stem 162 engages an electrical brush 163 connecting with a movable contact plate 164 carried by but insulated from the boss 97 and rotating in unison with the movable frame 29 and the tubular casing 94.

Plate 164 is connected by individual lead rods 165 mounted in but insulated from the casing 94, there being provided a rod for each of the can testing units. Each rod 165 (Fig. 8) is connected by a wire 166 which leads to a binding post 167 (shown in Figs. 4, 9 and 13) which is threaded on the end of the stem 143 and, as shown in the drawings, stem 143 is in electrical connection with the pin 142, the lever 141 and its contacting head 149. The contact points in the circuit at the contact members 149 and 153 are indicated in Fig. 8 by the numeral 168 and the opposite side of this contact 168 is connected with a wire 169 leading to the lamp 154 through a binding post 171 (shown in Figs. 9 and 11) through which the pin 153 passes. The other side of the lamp is grounded at 172 which, in practice, is the movable frame 29.

A wire 173 from the negative side of the source of electrical energy is grounded at 174 which, in practice, is the stationary frame 22 which is electrically connected with the movable frame 29 thus completing the circuit. It will be evident that with switch 161 closed and the contact 168 closed that the circuit is complete and an electrical current will flow through the lamp 154.

When the lamp 154 of any particular can testing unit is thus illuminated by action of a can passing through its operating cycle, the operator will immediately know that the can is faulty and will remove it from the machine when that particular unit has reached a point in its travel where the can is automatically released by outward movement of its clamping plate 66 under the reversed action of the clamping parts of the can carrier previously described.

The air in a can 62 which has just passed through its testing cycle, being at a pressure in excess of atmospheric pressure, will escape around the open edge of the can as plate 66 moves back and this action will sweep out any dust particles and keep the face of the disc 61 in proper condition as an effective sealing member.

The diaphragm 125 of the testing device will be depressed and the light circuit will be closed in each unit when a can is removed and this is independent of the condition of the can and whether or not the lamp has been lighted by a defective can during the testing operation. This lighting of each unit, however, in no way interferes with the testing operation since it occurs between testing cycles. It is useful in indicating to the operator that the electrical circuit is not defective and since the light is not extinguished until the proper pressure of air is in the can it provides an index to the pressure of air and to the proper clamping of a can prior to being tested.

The disc 53 of each can testing unit is preferably of sufficient size to accommodate various sizes and shapes of cans up to a certain maximum. In like manner, plate 66 is adapted to operate upon cans of various shapes and sizes within certain limits.

The can receiving cradles are of such a construction as to permit adjustment to a certain shape or size of can within certain limits or they may be completely changed by substitution of parts adapted to hold a particular shape or size of can. It is for this purpose that the arms 69 (Fig. 5) are formed with the slotted lugs 71 which permit ready removal from or replacement upon the rod 63 without disturbing the other parts of the cradle. Such a removal is accomplished by an unscrewing of the nut 72 associated with that particular arm and disconnecting the slotted lugs 71 from their eye bolt 70. Thus the eye bolts remain on their rods but may be slid longitudinally thereon or may also be moved into various radial positions but regardless of this the eye bolts will fit in between the lugs of the arms being connected therewith. Sets of arms 69 of different shapes and sizes may be provided and adjusted in place for different types of cans. For the plain, round or circular cans within certain limits however, such as illustrated in Fig. 5, the arms 69 are merely shifted radially on their rods 63 so as to be tangent to the can's circumference, thus adapting them to different can diameters. For odd or irregular can shapes, arms of different shapes and sizes are substituted.

While the machine, as illustrated, is adapted to a wide range of can shapes and sizes, it is sometimes desirable to test cans of the nozzle type and this can readily be done by a slight change in the parts. There is illustrated in Figs. 6 and 7 the adaptation of the machine to a rectangular can 181 having a nozzle 182. In such a can air is conveyed to its interior through its nozzle 182 and for this purpose, can supports 183 are substituted for the arms 69 and are placed in the regular manner upon the rods 63. The nozzle 182 of the can is then clamped against a rubber button 184 carried on a bushing 185 which is threadedly secured to the disc 53 in the same position previously occupied by the bushing 118. Such a can 181 is clamped in the usual manner and air is introduced through the nozzle 182 by passing through an air port formed centrally of the bushing 185 and communicating with the air passage 117.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a pneumatic can tester, the combination of a movable frame, a plurality of can testing units carried thereby, each unit comprising a can carrier, a can clamping member, a can leak detecting device and a can leak indicating lamp, and means supplying air under pressure both to the interior of the can when clamped in said carrier by said clamping member and to the interior of said detecting device, whereby said detecting device operates its associated leak indicator upon any diminution of the pressure in the can through leakage.

2. In a pneumatic can tester, the combination of a movable frame, a plurality of can testing units carried thereby, each unit comprising a can carrier, a can clamping member, a can leak detecting device and an electric lamp, means supplying air under pressure both to the interior of the can when clamped in said carrier by said clamping member and to the interior of said detecting device, and means in electrical connection with said lamp and said detecting device for closing the electrical circuit for lighting the lamp upon any diminution of the pressure in the can through leakage during the testing cycle.

3. In a pneumatic can tester, the combination of a stationary frame, a movable frame mounted on said stationary frame, a plurality of can carriers carried by said movable frame, means supplying air under pressure to the interior of cans clamped in said carriers for testing, a can leak detecting device associated with each can carrier, each device embodying an electrical circuit utilizing said frames for conducting an electrical current, and a can leak indicating lamp for each of said carriers included in the circuit and operable by any leakage of air from the can in its carrier while under test.

4. In a pneumatic can tester, the combination of a movable frame, a plurality of can carriers mounted on said frame, a clamping head associated with each carrier for clamping a can in testing position therein, each of said can carriers embodying can support members removable and replaceable for cans of different shapes and sizes, a can leak detecting device, a can leak indicating lamp for each carrier, means supplying air under pressure to the interior of a clamped can and means associated with said detecting device for operating said leak indicator in the event of air leaking from the can under test.

5. In a pneumatic can tester, the combination of a movable frame, a plurality of can carriers mounted on said frame, a clamping head associated with each carrier for clamping a can in testing position therein, each of said can carriers embodying can support members adjustable for cans of different sizes, a can leak detecting device, a can leak indicating lamp for each carrier, means supplying air under pressure to the interior of a clamped can and means associated with said detecting device for operating said leak indicator in the event of air leaking from the can under test.

6. In a pneumatic can tester, the combination of a movable frame, a plurality of can testing units carried thereby, each unit comprising a can carrier, a can leak indicator and a can leak detecting device, said device embodying a movable contact element included in an electrical circuit passing through said leak indicator, means supplying air under pressure to the interior of a can clamped in one of said carriers and to the said detecting device associated therewith for normally holding said contact element to break connection of the said electrical circuit, and means within said detecting device for moving said contact element to establish an electrical current through said leak indicator circuit upon any diminution of the pressure in the can through leakage.

7. In a pneumatic can tester, the combination of a rotary frame, can carriers thereon, each carrier being provided with a plain and uniform visual signal device which is operated independent of any discharge of the can from its carrier and has the same appearance in connection with each leaky can, and means for operating any of said signal devices by a reduction of air pressure in the can associated with the operated signal device.

MAGNUS E. WIDELL.